Sept. 5, 1939.   E. G. BURKHARDT   2,172,238
CAMERA SHUTTER
Filed May 26, 1937

Ernest G. Burkhardt,
INVENTOR;
BY
ATTORNEYS.

Patented Sept. 5, 1939

2,172,238

UNITED STATES PATENT OFFICE 2,172,238

CAMERA SHUTTER

Ernest G. Burkhardt, Rochester, N. Y., assignor to Eastman Kodak Company, Rochester, N. Y., a corporation of New Jersey Application May 26, 1937, Serial No. 144,850

4 Claims. (Cl. 95—60)

This invention relates to camera shutters of the blade and cover blind type, and more particularly to a novel shutter stop which limits the return movement of the shutter blade.

An object of the invention is the provision of a shutter stop which not only limits the return movement of the shutter blade, but is movable to position the shutter to permit the taking of either instantaneous or bulb exposures.

Another object of the invention is the provision of such a shutter stop which may be readily and easily moved by the operator to selectively position the shutter for the desired type of exposure.

Still another object is the provision of such a stop which is simple in construction, inexpensive to manufacture, and highly effective in use.

To these and other ends, the invention resides in certain improvements and combinations of parts all as will hereinafter be more fully described, the novel features being pointed out in the claims at the end of the specifications.

In the drawing.

Similar reference numerals throughout the several views indicate the same parts.

The present invention relates to a shutter stop which is adapted to be used in shutters of the blade and cover blind type such as used on box cameras of moderate price. These shutters comprise, in general, a pivoted shutter blade which is arranged to be moved on a pivot in one direction by means of a shutter trigger so as to tension the shutter spring. At a predetermined point, however, the shutter slips off the trigger, and, under the action of the spring, is quickly returned to its original position. On this return stroke of the shutter, a slot therein momentarily uncovers an opening in the camera to make an instantaneous or snap-shot exposure. When, however, the shutter blade is being tensioned, the shutter trigger covers the slot in the shutter blade and thus provides a light trap therefor, as is well known to those in the art. After the exposure is made, the shutter trigger is released and returned, under the action of a spring, to its original position.

In order to permit the taking of bulb or time exposures, the present invention provides a shutter stop which may be moved to rotate the shutter blade so as to bring the slot therein into registry with the exposure openings in the camera. In this position the shutter trigger alone controls the length of exposure.

Figure 1:
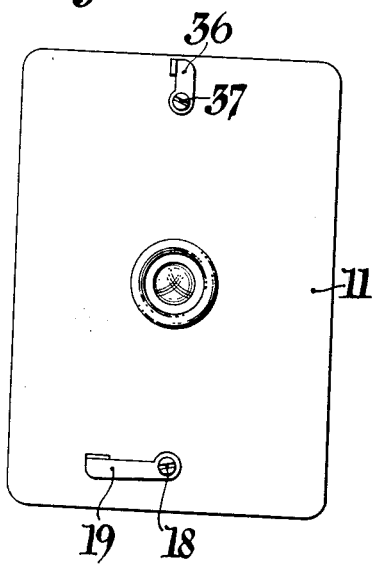
Fig. 1 is a front view of a camera of the box type showing the application thereto of a shutter having a bulb stop constructed in accordance with the preferred embodiments of the invention.

Referring now to the drawing wherein is shown a shutter of the class described applied to a camera of the box type generally indicated by the numeral 11. The shutter mechanism is mounted on a shutter plate 12 which is secured to the front wall of the camera housing in any suitable and well known manner. A shutter blade 13 is mounted for oscillation on a pin or stud 14, and is formed with an elongated arcuate slot 15 arranged to uncover a circular opening 16 in the plate 12 through which an exposure is made. The shutter is operated by means of a shutter trigger 17 which is pivotally mounted on a pin 18 and operated by a lever 19 which is accessible from the front of the camera, as shown in Fig. 1. The trigger is affixed to turn with pin 18.

Figure 2:
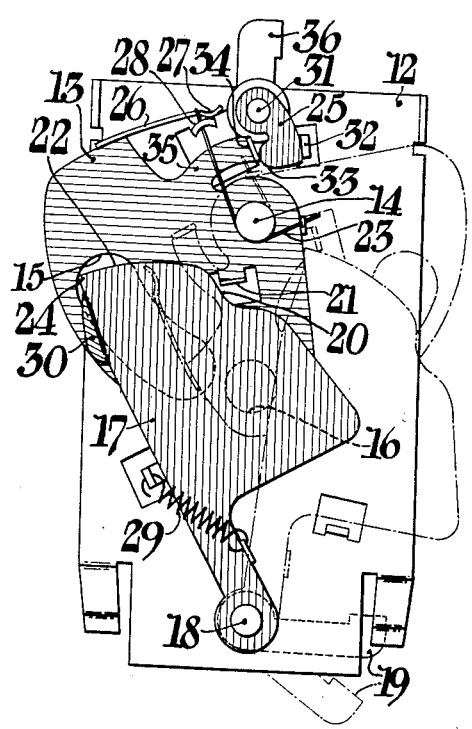
Fig. 2 is an enlarged view of a shutter of the blade and cover blind type showing the relation thereto of a bulb stop constructed in accordance with the present invention, the stop being in position to permit the taking of instantaneous or snapshot exposures.

Fig. 2 shows the shutter blade and trigger in their inoperative position to provide a light trap for the opening 16. To operate the shutter, the lever 19 is depressed thus rotating the trigger 17 in a clockwise direction on the pin 18 to bring leading edge 20 of the trigger into engagement with a lug 21 struck up from the shutter 13. Upon further depression of the lever 19, the shutter and trigger are rotated about their pivots to the dotted position shown in Fig. 2, the lug 21 sliding along the upper cam surface 22 of the trigger 17. This movement of the shutter tensions the shutter spring 23.

When, however, the lug 21 reaches the end of the cam surface 22 it slips over the angular corner 24 of the trigger 17, and, under the action of the spring 23, quickly returns the shutter blade 13 to its original position, as shown in full lines in Fig. 2. On this return stroke of the shutter, the slot 15 thereof momentarily uncovers the opening 16 to make an instantaneous or snapshot exposure, the trigger 17 remaining in the position illustrated in Fig. 4.

A shutter stop broadly designated by the numeral 25, and hereinafter more fully described, may be positioned in the path of the shutter 13 to limit the return movement thereof, as is apparent from the inspection of Figs. 2–4.

A shutter rebound check may also be provided to retard the momentum of the shutter 13 just prior to the engagement thereof with the stop 25. As shown in Fig. 2, this rebound check may be in the form of a leaf spring 26, one end of which is secured to the shutter 13, while the free end thereof is bent, as shown at 27, to afford a wiping action as it passes over the upstruck ear 28 to which the shutter spring 23 is anchored.

Upon release of the lever 19, the trigger 17 returns to its original position by reason of the coil spring 29. To facilitate the return of the trigger, the latter is provided with an inclined portion 30 which upon engaging the lug 21 lifts the trigger 17 so that it will slide over the lug to the position illustrated in Fig. 1. This movement may take place because of the flexibility of the thin sheet metal of which the trigger 17 is made. In making an instantaneous exposure, as above described, the time of exposure is controlled entirely by the movement of the slot 15 over the opening 16 and the tension of spring 23.

In order to make a bulb exposure, it is obviously necessary to uncover the opening 16 for a period of time longer than is necessary for instantaneous exposures. To accomplish this result, the present invention provides a means whereby the shutter 13 may be rotated on the stud 14 so as to bring the slot 15 of the shutter into register with the opening 16, as clearly illustrated in Fig. 4, before the trigger is depressed at all. It is thus apparent that when the shutter and trigger are in the position shown in Fig. 4, the sensitized film will be exposed as long as the lever 19 is held down so as to maintain the trigger 17 in position to uncover the opening 16. Such exposures are known to those in the art as "bulb" exposures.

The means for moving the shutter comprises, in the present embodiment, the shutter stop 25 preferably of the shape shown in the drawing. This stop is secured to and rotatable with a pin 31 which extends through and is rotatably mounted in the shutter plate 12 in the front wall of the camera 11. When the stop is in the position shown in Fig. 2, it engages an upstruck ear 32 on the plate 12 and acts merely as a stop to limit the return movement of the shutter 13.

Figure 3:
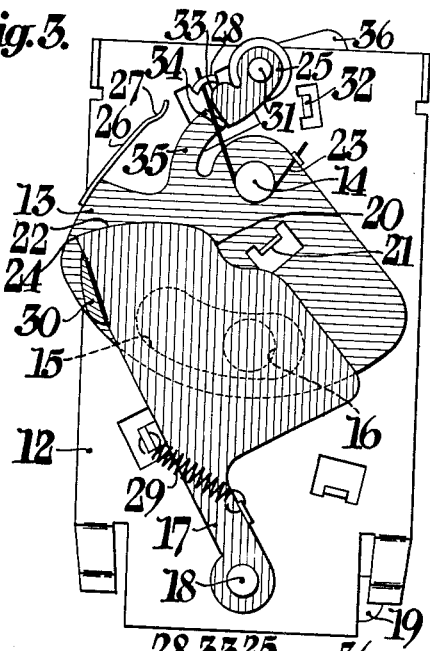
Fig. 3 is a view similar to Fig. 2, but with the stop moved to position the shutter to permit the taking of bulb or time exposures, the shutter trigger being positioned over the exposure aperture to form a light trap therefor.
Figure 4:
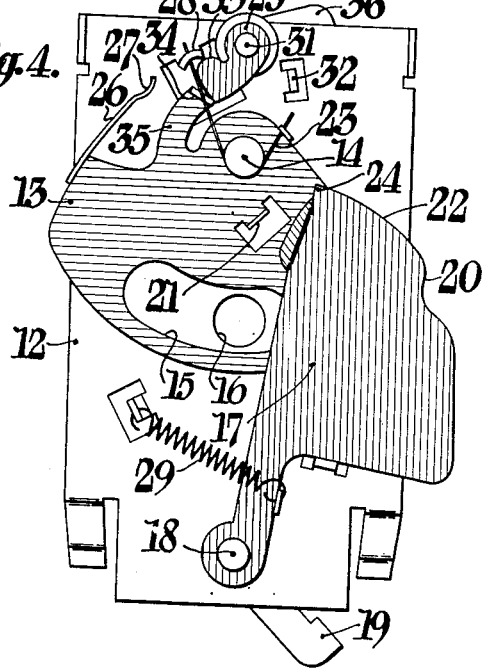
Fig. 4 is a view similar to Fig. 3, but with the shutter trigger moved aside to uncover the exposure aperture to make a bulb exposure.

When, however, the pin 31 is rotated in a clockwise direction, as viewed in Figs. 2–4, the cam surface 33, on the stop 25, engages a lug 34 formed on an arm 35 integral with the shutter 13 and concentric with the stud 14, and rotates the shutter in a counter-clockwise direction to the position shown in Fig. 3, the stop 25 then abutting the ear 28 on the plate 12. In this position, the slot 15 of the shutter is brought into registry with the opening 16. The stop 25 is moved to its different positions by means of a hand lever 36 which is secured to the outer end of the pin 31 by means of a screw 37. The lever 36 is accessible from the camera front, as clearly illustrated in Fig. 1.

When the lever 19 is now depressed, to operate the trigger 17, the latter will rotate the shutter 13 to the dotted position shown in Fig. 2, as above described. When, however, the shutter is released, it will quickly rotate in the opposite or clockwise direction, under the action of the spring 23, until the lug 34 engages the surface 33 of the stop 25, thus limiting the return of the shutter so as to bring the slot 15 thereof into registry with the opening 16 to uncover the latter. With the shutter in this position, the sensitized film will be exposed as long as the trigger 19 is maintained in the position illustrated in Fig. 4.

After the desired exposure is made, however, the lever 19 is released, and the spring 29 returns the trigger to its original position, as shown in Figs. 2 and 3 and above described, thus affording a cover for the opening 16. Thus in making bulb exposures, the time of exposure is controlled solely by the trigger 17, while in snapshots the shutter 13 controls the length of exposure. The shutter 13 may be easily and quickly returned to the position shown in Fig. 1 by merely moving the lever 36 to rotate the pin 31 and the stop 25 in a counter-clockwise direction, thus moving the cam surface 33 out of engagement with the lug 34, see Fig. 2. The shutter 13 is now free to rotate on a pin 14, under the action of the spring 23, to move the shutter from the position shown in Fig. 3 to the position shown in Fig. 2 to again permit the taking of instantaneous or snapshot exposures.

It is thus apparent from the above description that the present invention provides a shutter stop which may be moved to one position to rotate the shutter to permit the taking of a bulb exposure, or is movable to another position to permit the taking of snapshots or instantaneous exposures. In both positions, the stop affords a means for limiting the return movement of the shutter thus accurately positioning the latter so that the desired exposure may be made.

While only one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. In a photographic shutter, the combination with an apertured shutter plate, a spring operated shutter pivotally mounted on said plate and movable in one direction to uncover said aperture to make an exposure, a lug on said shutter, a shutter operating trigger for moving said shutter in the opposite direction to tension said shutter, of a pin rotatably mounted on said plate adjacent the pivot point of said shutter, a shutter stop mounted on one end of said pin and positioned in the path of said shutter when the latter is moved in said one direction to limit the return movement thereof, a cam surface on said stop arranged to be moved to engage said lug upon rotation of said pin to one position whereby said shutter is shifted to uncover said aperture, said trigger serving to cover said aperture when said shutter is shifted, means for moving said trigger to uncover said aperture to make a time exposure, said cam being movable upon rotation of the pin to another position to permit said shutter to only momentarily uncover said aperture to make an instantaneous exposure when said trigger is operated, a manual control lever mounted on the other end of said pin to move said cam to said positions, and means on said plate for limiting the movement of said cam.

2. In a photographic shutter the combination with an apertured plate, a slotted shutter pivotally mounted on said plate and adapted to be moved to bring said slot into registry with said aperture to make an exposure, of a member rockably mounted on said plate adjacent the pivot point of said shutter and movable relative thereto to engage and move said shutter about its pivot so that said slot uncovers said aperture, a shutter trigger mounted on said plate and arranged to cover said aperture when said shutter is positioned, and means for moving said trigger to uncover said aperture so that said exposure will be controlled by movement of said trigger.

3. In a photographic shutter the combination with an apertured plate, a pivoted slotted shutter mounted on said plate and adapted to be moved to bring said slot into registry with said aperture to make an exposure, a spring operated shutter trigger arranged to engage said shutter to move the latter in one direction and cooperating with the shutter during such movement to cover said aperture, means for moving the shutter in the opposite direction, of a shutter stop pivotally mounted on said plate and arranged to be engaged by said shutter to limit the return movement thereof, means for moving said stop about its pivot to engage and turn said shutter about its pivot to bring the slot therein into registry with said aperture, and means for moving said trigger to uncover said aperture in order that the trigger will provide the sole means for controlling the length of the exposure.

4. In a photographic shutter the combination with an apertured plate, a pivoted slotted shutter mounted on said plate and adapted to be moved to bring said slot into registry into said aperture to make an exposure, a spring operated shutter trigger arranged to engage said shutter to move the latter in one direction and cooperating with the shutter during such movement to cover said aperture, means for moving the shutter in the opposite direction, of a shutter stop pivotally mounted on said plate and arranged to be engaged by said shutter to limit the return movement thereof, a cam on said stop, means for rotating said stop to bring said cam into engagement with said shutter to move the latter to uncover said aperture so that said shutter is ineffective in controlling the exposure, and means for moving said trigger to uncover said aperture to make the exposure.

ERNEST G. BURKHARDT.